United States Patent [19]

Taniguchi

[11] Patent Number: 4,602,154

[45] Date of Patent: Jul. 22, 1986

[54] PHOTODETECTOR FOR GENERATING POSITION SIGNALS

[75] Inventor: Yutaka Taniguchi, Kanagawa, Japan

[73] Assignee: Fuji Photo Film Co., Ltd., Kanagawa, Japan

[21] Appl. No.: 548,256

[22] Filed: Nov. 2, 1983

[30] Foreign Application Priority Data

Nov. 2, 1982 [JP]  Japan .................... 57-191902

[51] Int. Cl.⁴ ............................................ H04N 1/10
[52] U.S. Cl. ................................ 250/227; 250/235;
358/293
[58] Field of Search ............... 250/227, 234–236,
250/237 G, 228; 350/6.5, 6.6, 6.7, 6.8, 6.9, 6.91;
358/285, 288, 293

[56] References Cited

U.S. PATENT DOCUMENTS 4,019,186  4/1977  Dressen et al. .................. 250/227

Primary Examiner—Edward P. Westin

Attorney, Agent, or Firm—Sughrue, Mion, Zinn, Macpeak, and Seas

[57] ABSTRACT

A photodetector arrangement has an elongate, transparent light conducting member for causing light incident on a side periphery thereof to propagate axially therethrough toward an end thereof. A photosensitive device is located in the vicinity of the end of the light conducting member to produce an electric signal in response to light streamed through the end of the light conductor. A light interceptor is provided for limiting a quantity of light which is incident on a part of the light conductor adjacent to the photosensitive device to be detected by the device. Alternative to the light interceptor, the photosensitive device may include a solid state image sensor having an array of photosensitive cells disposed to receive light streamed out of a portion of the end of the light conducting member, which portion is near to the side periphery of the light conducting member on which the light is incident.

17 Claims, 13 Drawing Figures

PHOTODETECTOR FOR GENERATING POSITION SIGNALS

BACKGROUND OF THE INVENTION

1. Field of the Invention

The present invention relates to a photodetector arrangement applicable to a light beam scanning apparatus and, particularly, to a light beam scanner for sweeping a light beam to read out or record image information.

2. Description of the Prior Art

In a prior art light beam scanning apparatus, a light beam emitted from a light source such as a laser is reflected and swept by a mirror which is swung by a galvanometer. Where such a scanner is applied to an image information recording system, an acoustooptic modulator (AOM) may be used in order to modulate the light beam with image information signals so that the modulated beam scans a photosensitive recording medium to record the image information thereon. Where it is applied to an image information read-out or reproducing system, on the other hand, a medium carrying image information thereon may be scanned with the light beam to allow the information to be read thereoutof by sensing light transmitted therethrough or reflected therefrom.

Particularly, when a radiation image stored in a stimulable phosphor sheet is read out, the laser beam is used as stimulating rays, and the read out of the radiation image is performed by scanning the sheet with the laser beam and photoelectrically detecting the light emitted from the sheet to obtain signals associated with the radiation image. Whether the light beam scanner of the type as described above is applied to an image information recording system or to an image information read out system, it is desirable that the light beam is swept at a predetermined speed. In an image information recording system, for example, an image with a uniform quality can be recorded if the exposure time per pixel is constant. In an image information read out system, on the other hand, an image can uniformly be produced if integration time per pixel is constant.

It will be seen from the above that maintaining the scan speed of the light beam constant is an important consideration in achieving high quality images. However, it is difficult to maintain the scan speed strictly constant due to the inherent structural conditions of the apparatus. Usually, a signal indicative of a position of the light beam is generated in response to a movement of a galvanometer and an image signal is recorded or integrated in synchronism with the position signal. The generate the position signal, a photodetector is employed and the photodetector has to provide a stable signal entailing a minimum of noise or fluctuation. A prior art photodetector to generate the position signal uses a light conductor in the form of an elongate, cylindrical member made of acrylic resin or the like. On the side face of the light conductor, there is provided optical grids or gratings along the longitudinal axis thereof. The optical grids or gratings are formed by vapor-depositing, for example, chromium in the form of stripes. A photosensitive device such as a photomultiplier is located at either end of the light conductor. A light beam sweeping arrangement is so arranged as to cause a light beam to scan the array of optical grids. The light entering the light conductor through the grid array is partly allowed to propagate over the light conductor to reach the photosensitive device, while undergoing repeated reflection and diffusion thereinside. In such a prior art photodetector, as the scanning beam is incident on a part of the light conductor which is adjacent to the photosensitive device, the amount of incident light on the device may sometimes increase to a significant level. Then, the reference signal developed from the photosensitive device may increase to an extremely high level. The signal level progressively decreases in inverse proportion to a distance between the photosensitive device and the scanning beam. Generally, the ratio between maximum and minimum values of the signals which are desirable as reference signals is not larger than several times. Applying a signal having a larger level difference than the above-mentioned to a wave shaping circuit of the apparatus as a reference signal is undesirable because it would make the design of the wave shaper difficult and the stability of operation poor.

SUMMARY OF THE INVENTION

It is therefore an object of the present invention to eliminate the drawbacks inherent in the prior art photodetectors as described above.

It is another object of the present invention to provide a photodetector arrangement which is capable of supplying stable signals.

A photodetector arrangement in accordance with the present invention has an elongate, transparent light conducting member for causing light incident on a side periphery thereof to propagate axially therethrough toward an end thereof, and a photosensitive device located in the vicinity of the end of the light conducting member to produce an electric signal in response to light streamed through the end of the light conductor. Light interceptor means is provided for limiting a quantity of light which is incident on a part of the light conductor adjacent to the photosensitive device to be detected by the device.

Alternative to the light interceptor means, the photosensitive device may comprise a solid state image sensor which is adapted to have an array of photosensitive cells that are disposed to receive light streamed out of a portion of the end of the light conducting member, which portion is near to the side periphery of the light conducting member on which the light is incident.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENTS

Figure 1:
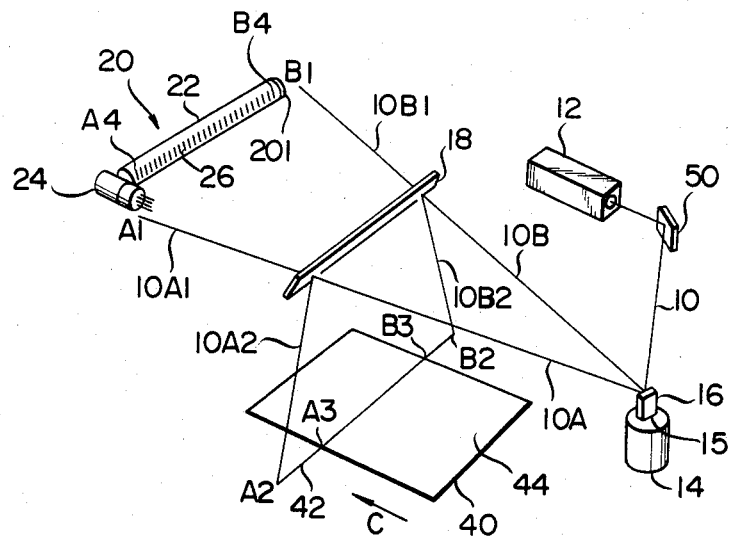
FIG. 1 is a schematic perspective view of a light beam scanning apparatus incorporating a photodetector arrangement in accordance with the present invention.

Referring to FIG. 1 of the drawings, a light beam scanning apparatus including a photodetector arrangement in accordance with the present invention is shown in a schematic perspective view. The scanner generally comprises a light source 12 for emitting a light beam 10, and a galvanometer 14 for sweeping the light beam 10. In the illustrated scanner, the light source 12 may comprise a laser.

Figure 2:
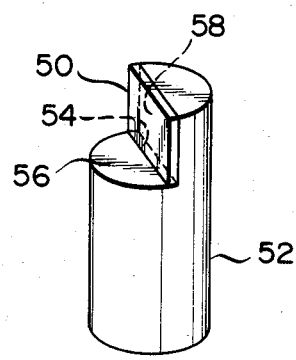
FIG. 2 is a perspective view of a mount for a stationary mirror included in the arrangement shown in FIG. 1.

The light beam 10 emitted from the light source 12 is reflected by a fixed mirror 50, and directed to a rotatable mirror 16 which is mounted on the galvanometer 14. As shown in detail in FIG. 2, the fixed mirror 50 interposed between the light source 12 and the mirror 16 may be supported on a generally cylindrical mirror mount 52.

In general, it is required for the fixed mirror 50 to have adequate accuracy to determine the orientation and position of the beam 10. Further, it is required for the fixed mirror 50 not to be liable to effect the accuracy due to temperature variations and also to suffer damages. In light of this, there have been some different approaches proposed for supporting the mirror on the mirror mount such as bonding lower portions of both main surfaces of a mirror to side walls of a channel formed in an end face of a cylindrical mirror mount, and holding the back of a mirror in contact with a surface of the mirror mount and then bonding them together by an adhesive which is injected into holes in the mirror mount from the back of the specific surface. A problem has been left unsolved in such prior art approaches in that because mirrors are generally made of glass, mirror mounts need also be formed of a material whose coefficient of thermal expansion is approximate to that of glass.

In the illustrative embodiment, the mirror 50 is made of glass and provided with a 3-millimeter thick, 18-square millimeter configuration. The mirror mount 52, serving as a support for the mirror 50, has a generally cylindrical shape which includes a semicircular end surface 56 and a flat surface 58 which extends parallel to the longitudinal axis of the cylinder. The mirror 50 is bonded to part of the end face 56 of the mirror mount 52 at a lower end face 54 thereof. The flat surface 58 merely serves as a backrest for determining a position and an angular orientation of the mirror 50 and, hence, it is not bonded to the back of the mirror 50. Stated another way, the mirror 50 is mechanically supported by the end face 54 only, while the flat surface 58 provides reinforcement for the mechanical support to determine a position and angle of the mirror 50. It follows that if the mirror mount 52 is made of metal such as aluminum having a larger coefficient of thermal expansion than that of mirror 50, it will not cause any deformation, error, damage or the like in the mirror configuration.

In FIG. 1, the mirror 16 is mounted on a rotatable shaft 15 mounted in the galvanometer 14. While the galvanometer 14 is not driven, the mirror 16 is maintained in its mechanically neutral position. On the energization of the galvanometer 14, the mirror 16 will swing to opposite sides away from the neutral position in response to drive currents conducted thereto, thereby sweeping the beam 10 over the range between positions 10A and 10B.

Figure 3:
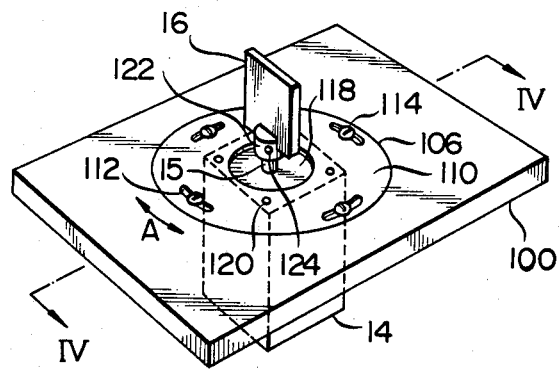
FIG. 3 is a perspective view showing details of a galvanometer and a rotatable mirror also shown in FIG. 1.
Figure 4:
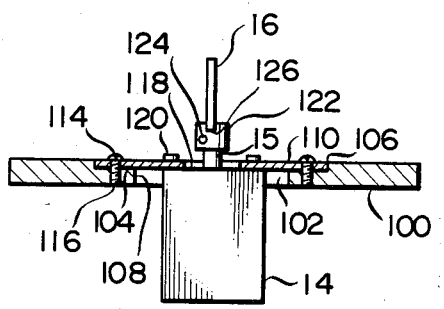
FIG. 4 is a cross sectional view along line IV—IV of FIG. 3.

As shown in detail in FIGS. 3 and 4, the galvanometer 14 is securely mounted on a flat base 100 of the apparatus. The base 100 is formed with a relatively large circular opening 102 which is stepped to have an annular shoulder 104 therein. As shown in FIG. 4, the opening 102 comprises a first circular bore 106 adjacent to the upper surface of the base 100, and a second circular bore 108 adjacent to the lower surface of the same. The bore 108 is concentric with and smaller in diameter than the bore 106. A disc 110 is received in the larger bore 106 to rest on the annular shoulder 104. The disc 110, in this embodiment, is formed with four arcuate slots 112 at spaced locations along the circumference of the disc 110. The imaginary circle including the arcuate slots 112 has a center which substantially coincides with the center of the shaft 15. In the bore 106, the disc 110 is positioned such that its arcuate slots 112 individually coincide with threaded holes 116 formed through the shoulder 104 of the base 100. Screws 114 are individually passed through the arcuate slots 112 into the threaded holes 116 to firmly connect the disc 110 to the base 100. Loosening the screws 114 will allow the disc 110 to be rotated about the shaft 15 within the range determined by the circumferential dimension of the slots 112.

The disc 110 has a concentric circular opening 118 in a central area thereof. Four threaded holes are shown in the figures as being formed through the disc 110 around the central opening 118. Screws 120 are driven into the threaded holes to fix the galvanometer 14 to the underside of the disc 110. With this construction, the shaft 15 of the galvanometer 14 projects upward through the center of the opening 118.

The shaft 15 carries a cylindrical mount 122 in a portion thereof above the base 100. A screw 124 is threaded into the mirror mount 122 from outside to abut against the periphery of the shaft 15, thereby fastening the mirror mount 122 to the shaft 15. A generally U-shaped receptacle channel 126 extends on the top surface of the mirror mount 122 to receive a lower end portion of the mirror 16. This portion of the mirror 16 is bonded to the walls of the channel 126 to be mechanically supported thereby.

Before the galvanometer 14 starts its operation, the shaft 15 may advantageously be held in its mechanically neutral position. The angular position of the mirror 16 relative to the shaft 15 is adjustable within a certain range by loosening the screw 124 to rotate the mirror mount 122 about the shaft 15, the radius of rotation being dependent on the diameter of the mirror mount 122. However, the radius of rotation is so small that the adjustment of the angular mirror position is quite difficult, except for rough one. In accordance with this particular embodiment, the adjustment of the angular mirror position is implemented by the disc 110 which is rotatable by a small amount about the shaft 15 together with the whole galvanometer 14 merely by loosening the screws 114, as indicated by a double-headed arrow A in FIG. 3. It will be seen that such a larger diameter of the disc 110 than that of mirror mount 122 allows the mirror 16 to be adjusted precisely and by a small amount, compared to the adjustment attainable with the screw 124.

Turning back to FIG. 1, a rectangular half-mirror or beam splitter 18 is disposed in a plane which contains the swept light beams 10A-10B. The half-mirror 18 splits the beam 10A into beams $10A_1$ and $10A_2$ and the beam 10B into beams $10B_1$ and $10B_2$, for example. While the beams $10A_1$ and $10B_1$ are transmitted through the beam splitter 18 to advance straight into a photodetector 20, the other beams $10A_2$ and $10B_2$ are reflected by the half-mirror 18 to reach a recording medium 40, for example. The recording medium 40 may comprise a sheet as illustrated, for recording thereon pictures with or without characters mixed therewith. A sheet feed mechanism, not shown, feeds the sheet as indicated by an arrow C. As the galvanometer 14 is energized to rotate the mirror 16, the light beam scans the medium 40 in the horizontal scan direction to define a single scan line 42. As the medium 40 is fed in the direction C, scan lines 42 are formed in the vertical direction. In this manner, the light beam scans a recording surface 44 of the medium 40 in both the horizontal and vertical scan directions.

Where the photodetector arrangement in accorance with the present invention is installed in a reading apparatus, the beams $10A_2$-$10B_2$ will be selectively reflected on or transmitted through the recording surface 44 of the medium 40 to read image information stored therein. Assuming that the recording medium 40 is one which includes a stimulable phosphor sheet therein, for example, the laser beam $10A_2$-$10B_2$ will stimulate the phosphor to read information out of the medium 40. Where the photodetector is applied to a recording apparatus, the medium 40 will contain a photosensitive, or radiation-sensitive material therein, and the laser beam 10 from the source 12 will be modulated by an modulator means such as acousto optic modulator (AOM), not shown, in response to image signals to thereby record pictures on the photosensitive material.

In this particular embodiment, the photodetector 20 comprises an elongate light conductor 22 made of acrylic resin or like transparent material and having a generally circular cross-section. A photosensitive device 24 such as photomultiplier is located adjacent to one end of the elongate light conductor 22. A number of stripes 26 are formed at spaced locations along the longitudinal axis of the light conductor 22 by vapor-depositing chromium or the like, for example, each extending in the circumferential direction of the light conductor 22. The stripes 26 constitute "optical grids or gratings" as will be referred to hereinafter. A mirror 201 may advantageously be mounted on the other end 203 of the light conductor 22 remote from the photosensitive device 24. As the beam is swept by the mirror 16 to scan the grids 26 on the light conductor 22 over the range $10A_1$-$10B_1$, it enters the light conductor so that part thereof propagates through the light conductor directly toward the photosensitive device 24 while undergoing repeated require and diffuse reflection, or propagates toward the mirror 201 to be reflected thereby toward the photosensitive device 24. The light incident on the photosensitive device 24 is transformed into an electric signal. The output signal of the device 24, therefore, has such a waveform as one shown in FIG. 11C, which shows that the quantity of light incident on the light conductor 22 decreases every time the light beam in the range $10A_1$-$10B_1$ scans one of the grids 26.

Figure 5:
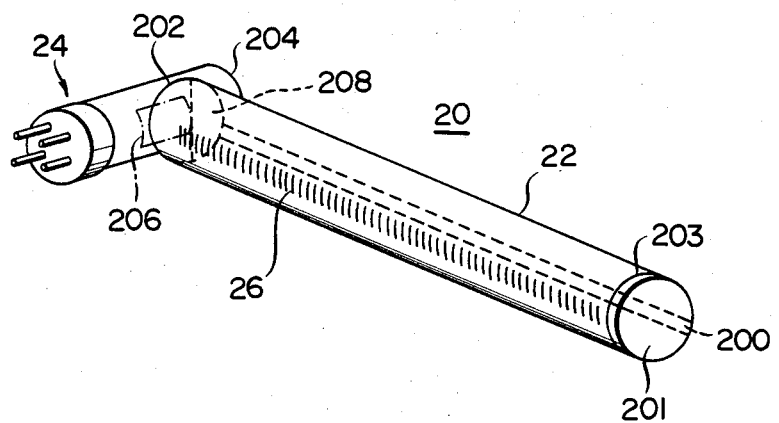
FIG. 5 is a perspective view of a photodetector arrangement in accordance with the present invention.

Referring to FIG. 5, a practical example of the photodetector 20 is shown. An elongate diffusion strip 200 extends along the longitudinal axis of the light conductor 22 in a position diametrically opposite to the array of grids 26. The diffusion strip 200 may comprise a thin layer of light diffusing paint applied to the light conductor 22 or a strip of microscopic undulation formed on the light conductor 22, so that light entering the light conductor 22 will be subjected to regular or diffuse reflection thereby to propagate through the light conductor.

Comprising a photomultiplier in this embodiment, the photosensitive device 24 is positioned in contact with or in the neighborhood of one end 202 of the light conductor 22. Light coming out from the end 202 of the light conductor 26 will be received by a photosensitive surface 206 which is arranged inside a glass casing 204. The photosensitive surface 206 forms part of a photocathode of the photomultiplier and may have a rectangular area of 8 millimeter by 24 millimeter, for example.

Figure 6:
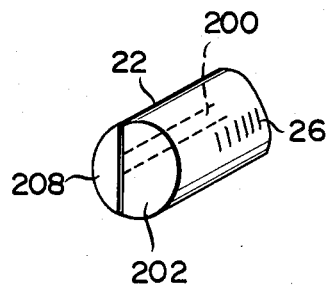
FIGS. 6-10 are views of various alternative embodiments of the present invention and useful for understanding their functions.
Figure 7:
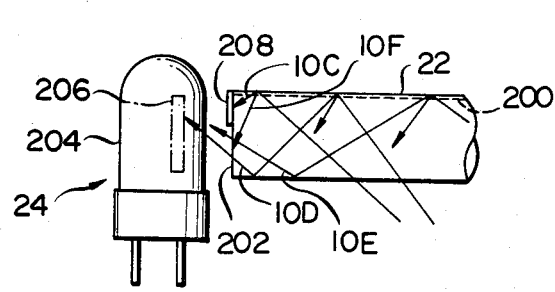

As shown in FIG. 6, a substantial area of the end surface 202 of the light conductor 22 is covered with a light intercepting member 208 which may comprise a flat plate or a layer of paint which intercepts light. The light interceptor 208 covers part of the end surface 202 which is remote from the grid array 26, that is, close to the diffuser strip 200. As shown in FIG. 7, the light interceptor 208 functions to limit the quantity of light which is incident on a portion of the light conductor 22 adjacent to the photosensitive device 24, and subjected to diffuse reflection at the side remote from the grid array 26 toward the photosensitive surface 206, e.g. a light component 10C out of light components 10C and 10F. Therefore, light components such as 10D and 10E as well as 10F which stream through the end 202 adjacent to the grid array 26 are allowed to reach the photosensitive surface 206.

Figure 11A:
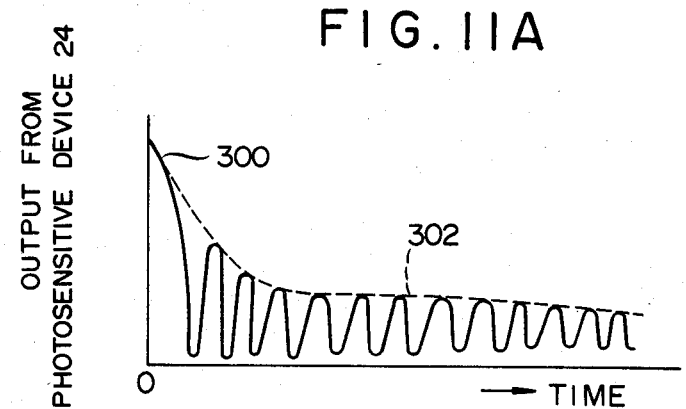
FIGS. 11A-11C are waveform diagrams each representing an output signal of a photosensitive device.
Figure 11B:
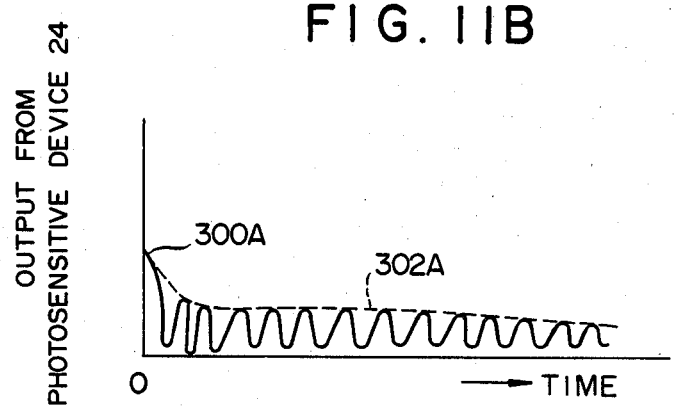
Figure 11C:
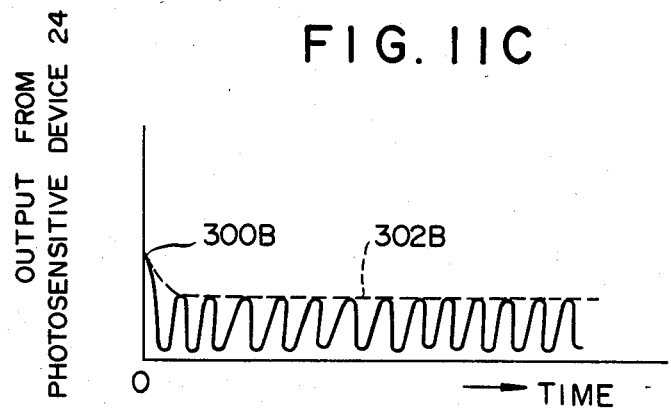

Referring to FIGS. 11A-11C, waveforms are shown in which the abscissa indicates time for each scan over the range $10A_1$-$10B_1$ and the ordinate, a level of signal produced from the photosensitive device 24. As shown in FIG. 11A, where both the light interceptor 208 and mirror 201 are absent, the output of the device 24 would have a sharp peak 300 at the start of a scan over the range $10A_1$-$10B_1$ and, thereafter, progressively lower its level, generating an envelope which has a sharp peak at its left end and progressively lowers to the right as indicated by a dotted line 302. This is because, when the light beam $10A_1$ is incident on the light conductor 22 at a position adjacent to the end 202, an intense light component such as 10C would reach the photosensitive surface 206 while, when the light beam $10B_1$ is incident on the light conductor at a position adjacent to the other end 203, only part of the light is allowed to reach the photosensitive surface 206 with the rest streaming out of the light conductor. Should such an output signal be employed as a reference signal necessary for the synchronization of an image reading or recording system, it would detriment the stability of the system operation, and thus make the design of a wave shaper for the reference signal difficult.

Meanwhile, where the light interceptor 208 is employed but not the mirror 201, the peak 300 at the left end of the output of the device 24 is greatly lowered (300A) as shown in FIG. 11B. The resultant envelope becomes generally flat as indicated by a phantom line 302A, but it still has a curvature progressively lowering to the right. FIG. 11C shows the waveform attainable in accordance with the illustrated embodiment which has both the light interceptor 208 and mirror 201. In FIG. 11C, the general output level is higher than in the case of FIG. 11B and its envelope 202B, flatter as a whole. The light interceptor 208 does not always need be held in contact with the end 202 of the light conductor 22, or may even comprise a flat plate which is open only in a limited area thereof for allowing parts of the light to be utilized, such as 10D, 10E and 10F at the end 202, to pass therethrough.

Figure 8:
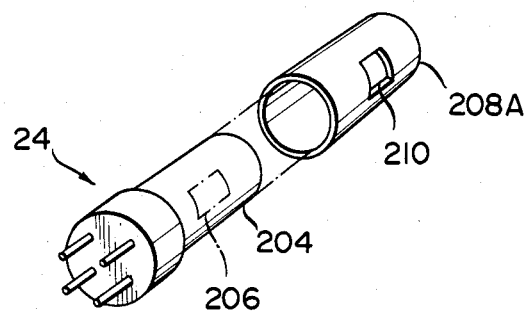
Figure 9:
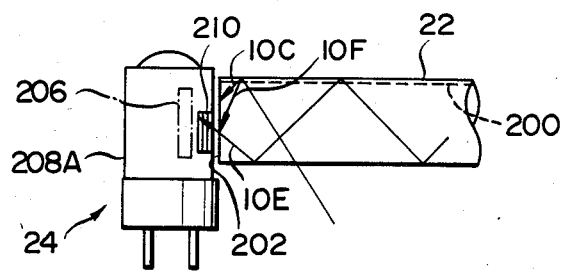

Referring to FIG. 8, another example of the light interceptor is shown. A phototube 24 has a glass casing 204 which is enclosed by a light intercepting casing 208A. As shown, the light interceptor casing 208A has a generally cylindrical configuration and is made of a material which does not transmit light. The casing 208A is formed with an optical opening 210 in part of its wall. The opening 210, which is generally rectangular in this embodiment, is positioned such that it will neighbor that side of the end 202 adjacent to the grid array 26 when the casing 204 of the photoelectric tube 24 is inserted into the casing 208A, as shown in FIG. 9. With this construction, the light interceptor 208A will allow only effective portions of the light such as 10E and 10F to reach the photosensitive surface 206 while intercepting the remaining portions which cause a peak 300 (FIG. 11A) in the output signal, such as 10C. It will be noted that the opening 210 needs only be an optical aperture which is substantially transparent for light, that is, it does not have to be a mechanically formed actual opening.

Figure 10:
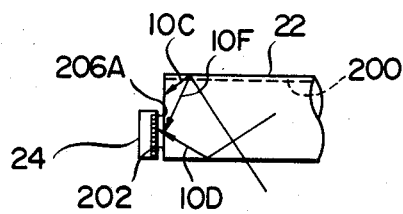

Another example is shown in FIG. 10 in which the photosensitive device 24 comprises a solid state photosensitive device such as photodiode. As shown, the solid state photosensitive device 24 has an array of photosensitive cells 206A located in the vicinity of the end 202 and adjacent to the grid array 26. The light component 10C, therefore, fails to become incident on the photosensitive array 206A.

In summary, it will be seen that the present invention provides a photodetector arrangement which insures stable operation of a system associated therewith while facilitating the design of a wave shaping circuit. The photodetector will prove particularly effective to provide desirable image quality when applied to a light beam scanning apparatus for an image recording or reading system.

Various modifications will become possible for those skilled in the art after receiving the teachings of the present disclosure without departing from the scope thereof.

What is claimed is:

1. A photodetector arrangement comprising:
    an elongate, transparent light conducting member for causing light incident on a side periphery thereof to propagate axially therethrough toward an end thereof;
    a photosensitive device located substantially at said end of the light conducting member to develop an electric signal in response to light streamed through the end of the light conducting member; and
    light interceptor means for limiting a quantity of light which streams out of a portion of said end of said member which is remote from the side periphery of said member on which the light is incident.

2. A photodetector arrangement in accordance with claim 1, wherein the light interceptor means comprises a covering member which does not transmit light therethrough, and covers a portion of said end of the light conducting member, which portion is remote from the side periphery of the light conducting member on which the light is incident.

3. A photodetector arrangement in accordance with claim 1, wherein the photosensitive device comprises a photomultiplier, the light interceptor means comprising an enclosure for enclosing said photomultiplier, said enclosure being made of a material which does not transmit light, and being formed with an optical opening which allows to pass therethrough light which leaves the light conducting member at a portion of said end adjacent to the side periphery on which the light is incident.

4. A photodetector arrangement in accordance with claim 2, wherein said covering member comprises a layer of paint which is not transparent to light and applied to said portion of the end of said light conducting member.

5. A photodetector arrangement in accordance with claim 2, wherein said covering member comprises a plate which is made of material not transparent to light and formed on said portion of the end of said light conducting member.

6. A photodetector arrangement in accordance with claim 1, further comprising a mirror located at an end of the light conducting member which is opposite to the photosensitive device to direct, by reflection, the light going out of the opposite end substantially back to the opposite end.

7. A photodetector arrangement in accordance with claim 1, wherein said light conducting member comprises an optical diffusion strip formed along a longitudinal axis of the light conducting member on a portion of a side periphery of the light conducting member which is opposite to a portion thereof on which the light is incident, thereby conducting in the longitudinal directions the light coming into the light conducting member.

8. A photodetector arrangement in accordance with claim 1, wherein said light conducting member comprises an array of optical gratings formed along a longitudinal axis of the light conducting member on a portion of the side periphery of the light conducting member on which the light is incident.

9. A photodetector arrangement comprising:
    an elongate, transparent light conducting member for causing light incident on a side periphery thereof to propagate axially therethrough toward an end thereof; and
    a solid state photosensitive device located substantially at said end of the light conducting member to develop an electric signal in response to light streamed through the end of the light conducting member;
    said photosensitive device having an array of photosensitive cells which is disposed to receive only light streaming out of a portion of said end of the light conducting member, which portion is near the side periphery of the light conducting member on which the light is incident, and not to receive light streaming out of the remaining portion of said end of said member.

10. Light beam scanning apparatus for scanning a recording medium with a light beam swept repeatedly in a scanning direction, comprising a photodetector arranged in the scanning direction for sensing the light beam swept, wherein said photodetector comprises:
    an elongate, transparent light conducting member having a longitudinal axis disposed in the scanning direction for causing light incident on a side periphery thereof to propagate in the longitudianl direction;

a photosensitive device provided substantially at an end of the light conducting member to produce an electric signal in response to light flowing out of the end of the light conducting member; and light interceptor means for limiting a quantity of light which streams out of a portion of said end of said member which is remote from the side periphery of said member on which the light is incident.

11. Apparatus in accordance with claim 10, wherein said light interceptor means comprises a covering member which does not transmit light therethrough, and covers a portion of said end of the light conducting member, which portion is remote from the side periphery of the light conducting member on which the light is incident.

12. Apparatus in accordance with claim 10, wherein said photosensitive device comprises a photomultiplier tube, said light interceptor means comprising an enclosure for enclosing the photomultiplier tube, said enclosure being made of a material which does not transmit light, and being formed with an optical opening which allows to pass therethrough light which leaves the light conducting member at a portion of said end adjacent to the side periphery on which the light is incident.

13. Apparatus in accordance with claim 11, wherein said covering member comprises a layer of paint which is not transparent to light and applied to said portion of the end of said light conducting member.

14. Apparatus in accordance with claim 11, wherein said covering member comprises a plate which is made of material not transparent to light and formed on said portion of the end of said light conducting member.

15. Apparatus in accordance with claim 10, further comprising a mirror located at an end of the light conducting member which is opposite to the photosensitive device to direct, by reflection, the light going out of the opposite end substantially back to the opposite end.

16. Apparatus in accordance with claim 10, wherein said light conducting member comprises an optical diffusion strip formed along the longitudinal axis of the light conducting member on a portion of a side periphery of the light conducting member which is opposite to a portion thereof on which the light is incident, thereby conducting in the longitudinal directions the light coming into the light conducting member.

17. Apparatus in accordance with claim 10, wherein said light conducting member comprises an array of optical gratings formed along the longitudinal axis of the light conducting member on a portion of the side periphery of the light conducting member on which the light is incident.

* * * * *